May 2, 1950 L. I. GARRISON 2,506,076
STONE CUTTING MACHINE
Filed Sept. 16, 1948 4 Sheets-Sheet 4

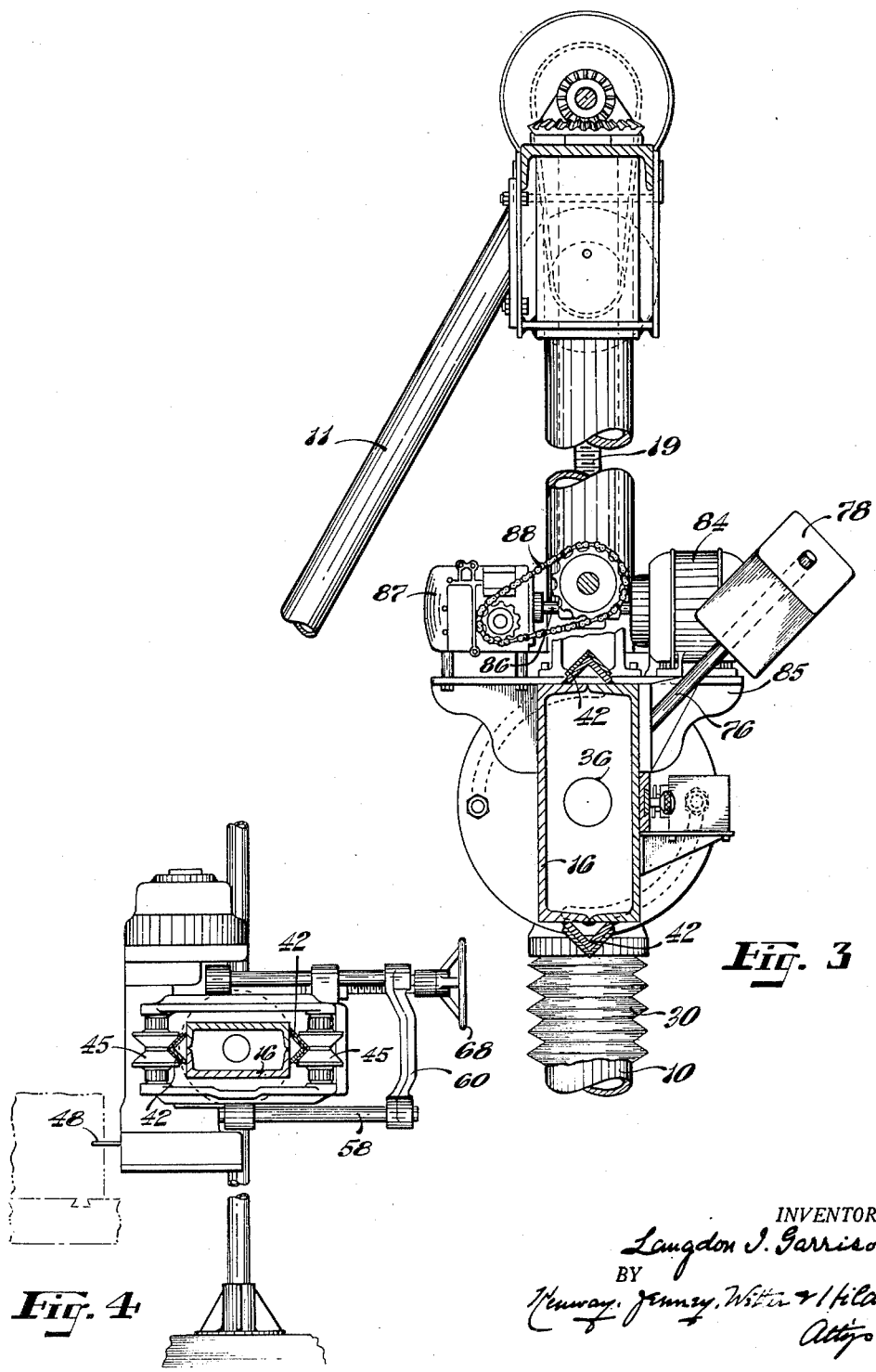

INVENTOR.
Langdon I. Garrison.
BY Kenway, Jenney,
Witter & Hildreth.
Attys.

Patented May 2, 1950

2,506,076

UNITED STATES PATENT OFFICE 2,506,076

STONECUTTING MACHINE

Langdon I. Garrison, Epson, N. H., assignor to The John Swenson Granite Co., Inc., Concord, N. H., a corporation of New Hampshire Application September 16, 1948, Serial No. 49,505

11 Claims. (Cl. 125—14)

This invention relates to stone cutting machines of the type employing a carriage movable on and along a horizontal beam and carrying a motor operated cutting wheel or disk. The invention more particularly comprises a novel and compact carriage construction and balanced mounting movable on the beam and including a spindle disposed below and transversely of the beam for carrying the cutting wheel. The carriage is of annular construction in the sense that it extends entirely around the beam and is supported on two rails disposed centrally of and extending along the top and bottom faces of the beam. The cutting wheel spindle is rotatably mounted in the lower portion of a frame which includes in its structure a plurality of vertical rods adjustable as a unit longitudinally in guide bearings in the carriage, thus providing a rugged and compact construction for performing the desired cutting functions. The beam is adjustable vertically and rotatably about its longitudinal axis, all of which characteristics, together with my novel and compact carriage construction, provide a superior machine for cutting stone. The production of an improved machine of this nature that will render efficient and dependable service comprises the primary object of the invention.

With this end in view an important feature of the invention consists in a spindle-carrying frame having three rods arranged in a triangular pattern, one rod passing in front of the horizontal beam, or on the cutter side thereof, and the other two passing on the other side of the beam, or the motor side thereof. This construction is advantageous in that it provides a very stiff frame which will support the cutting tool without distortion under conditions of heavy operating duty, while at the same time it provides clearance about the cutting tool which is thus located adjacent to the apex of the triangular pattern of the rods.

These and other features of the invention will be best understood and appreciated from the following description of a preferred embodiment thereof selected for purposes of illustration and shown in the accompanying drawings in which:

Fig. 3 is a sectional view taken on line 3—3 of Fig. 1,

Fig. 4 is a fragmentary view similar to Fig. 2, but illustrating the carriage adjusted to another position.

Figure 1:
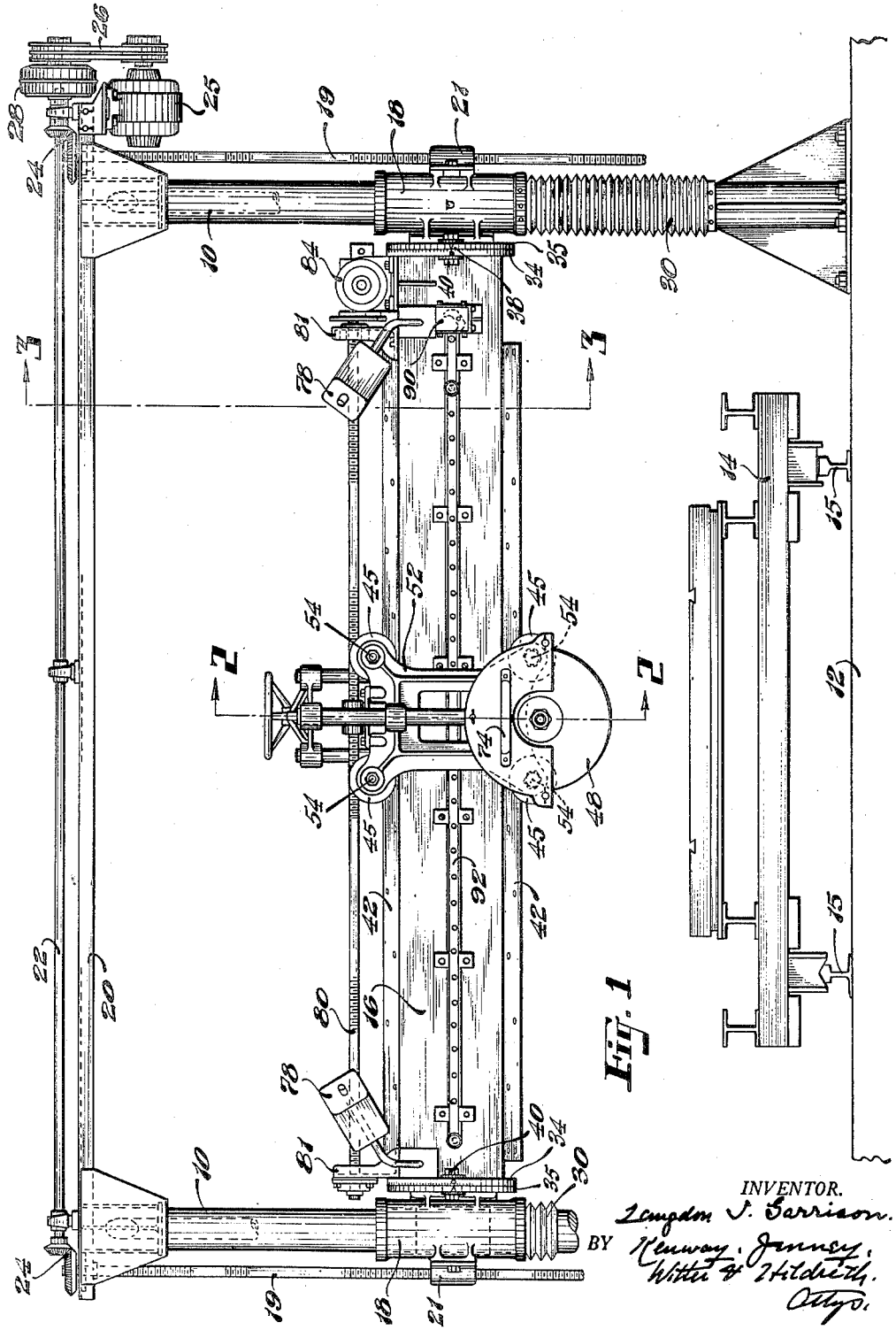
Fig. 1 is a front elevation of my improved machine.

The machine illustrated in the drawings comprises two vertical columns 10 braced by diagonal rods 11 and bolted to a base 12 at opposite sides of a work supporting carriage 14 riding on tracks 15 on the base. A horizontal beam 16 is disposed above the tracks and is supported at its ends on two sleeves 18 slidable on the columns 10. The sleeves are supported by two vertical rods 19 each journaled in a top plate 20 on one of the columns and in screw threaded engagement with a nut 21 fixed to the sleeve 18. The rods 19 are connected for simultaneous rotation by a shaft 22 and gearing 24. The shaft and rods are rotated by a motor 25 mounted at the top of the right hand column and connected to the shaft 22 through belts 26 and reduction gearing at 28. The columns are covered by corrugated expansion jackets 30 attached at their upper ends to the sleeves 18 and to the column base supports and serving to protect the columns from the dust of the cutting operation.

The beam 16 is hollow and rectangular in cross section and may be constructed in two halves welded or bolted together at 32. Each end of the beam carries a circular face plate 34 cooperating with a like plate 35 fixed to the adjacent sleeve 18, and the beam is mounted on and rotatably adjustable about two trunnions 36 at the two ends of the beam and disposed in its central longitudinal axis. The trunnions are carried by two of the face plates and rotatably supported in the other two adjacent face plates. The face plates are indexed at 38 and are provided with bolts 40 for securing them in adjusted position. Thus the beam is rotatably or angularly adjustable about its central longitudinal axis.

Figure 2:
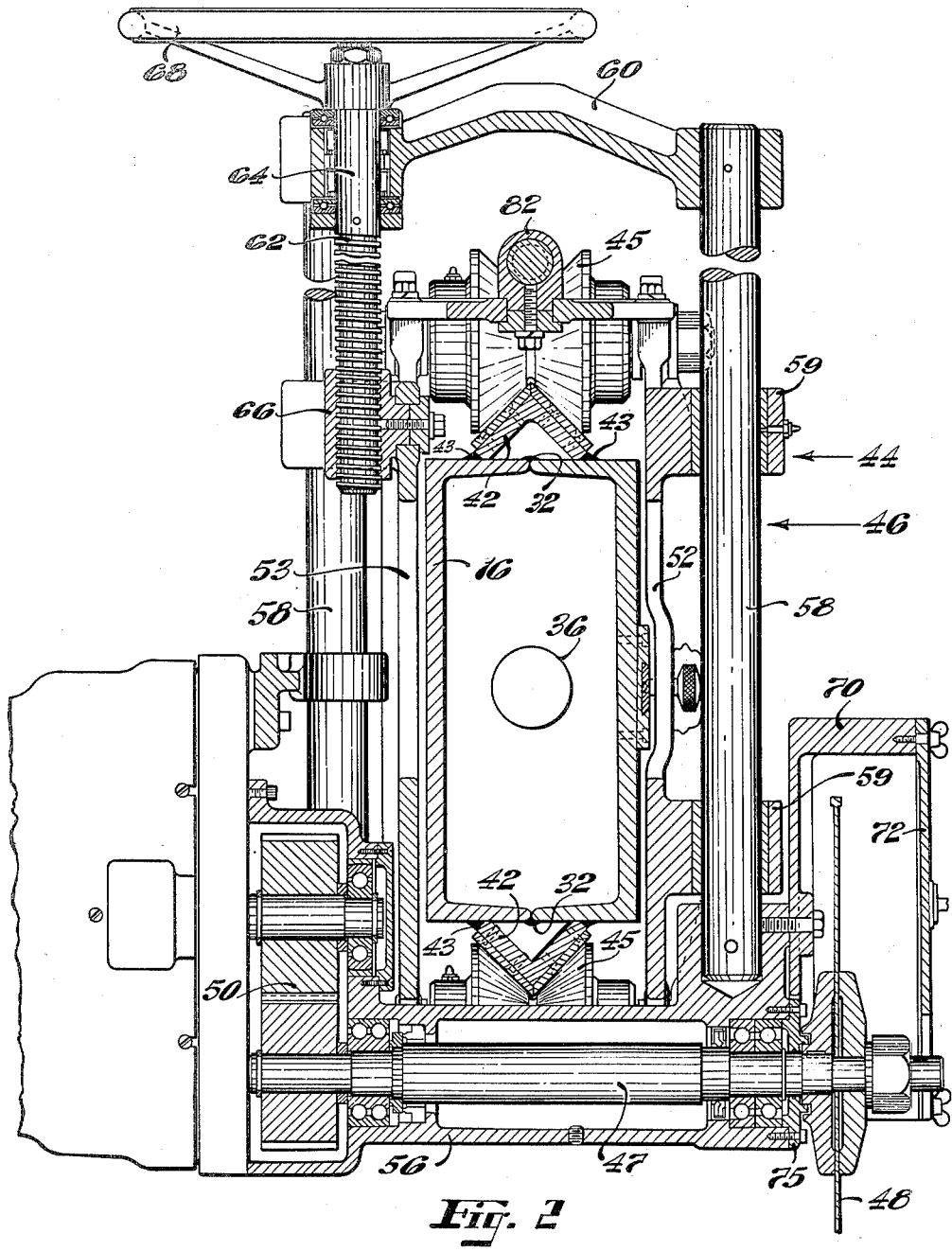
Fig. 2 is an enlarged sectional view taken on line 2—2 of Fig. 1.
Figure 5:
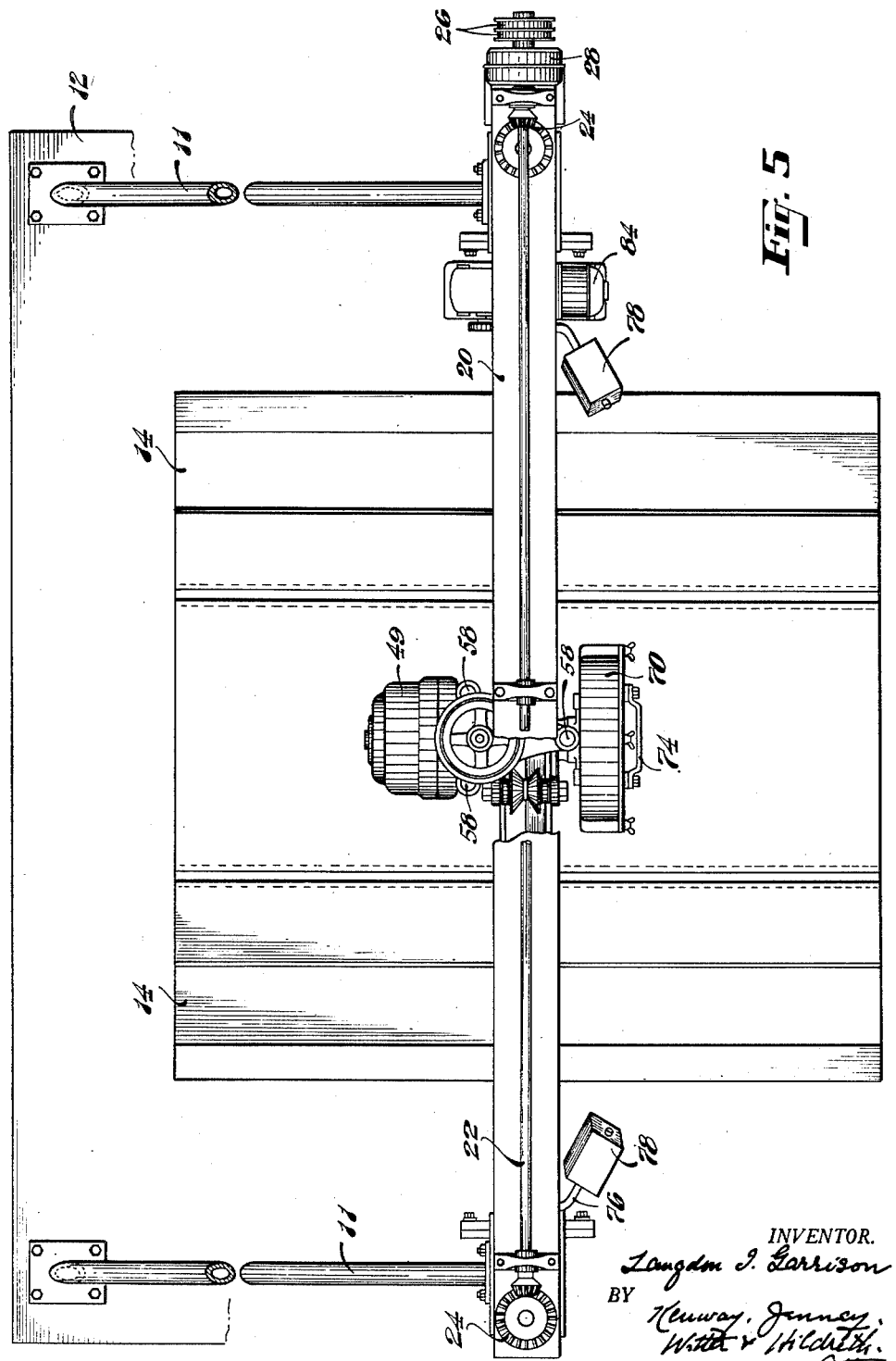
Fig. 5 is a plan view of the machine.

Two parallel guiding tracks 42 are affixed rigidly to opposite sides of the beam as by welding at 43. As illustrated in Fig. 2, these tracks are V-shaped in cross section and are disposed in opposed relation at the top and bottom faces of the beam with their apexes in a common vertical plane substantially coincident with and parallel to the central longitudinal axis of the beam. Thus the weight suspended by the tracks is balanced at the central longitudinal axis of the beam.

The stone cutting assembly of my improved machine is mounted to ride on the tracks 42 along the beam. This assembly comprises a carriage 44 supported on four wheels 45 of V-shaped cross section riding on the tracks and includes a frame 46 adjustably mounted on the carriage and having a spindle 47 journaled therein and disposed transversely of and beneath the beam. A stone cutting wheel 48 is mounted on the spindle at one side of the beam and a motor 49 carried by the frame 46 at the other side of the beam is operatively connected to the spindle through gearing 50.

The carriage 44 has two side castings 52 and 53 of similar construction extending above and below the beam as shown in Figs. 1 and 2. The two castings are connected together by four axles 54, two above and two below the beam, and the V-shaped wheels 45 are mounted on these axles between the two castings. Thus the carriage presents an annular construction entirely surrounding the beam.

The frame 46 includes in the lower portion of its structure a casting 56 within which is journaled the cutter spindle 47. Three vertical and parallel rods 58 are slidably supported in bearings 59 in the carriage 44 and rigidly attached at their bottom ends to the casting 56, two of the rods being located on the motor side of the beam and one being on the side of the cutting wheel 48. The top portion of the frame comprises a spider 60 rigidly connecting the top ends of the three rods. Thus the frame also embodies an annular construction entirely surrounding the beam and one which is triangular in its cross section.

The frame 46 and carriage 44 are connected and the frame is supported on the carriage by a shaft 62 rotatably journaled in the frame at 64 and in screw threaded engagement with a nut 66 fixed to the carriage. The shaft 62 is parallel with the rods 58 and is provided with a hand wheel 68 on its top end whereby the shaft can be rotated and the frame adjusted on the carriage in a direction transversely of the spindle 47 and beam 16.

The upper portion of the cutting wheel 48 is protected by a guard housing 70 bolted to the frame 46. A front cover 72 attached to the housing carries the handle 74. The spindle 47 is supported on ball bearings at its ends and a grease packing retaining plate 75 is provided at the cutter end of the spindle. Two arms 76 attached to and extending laterally outward from the beam adjacent to its two ends carry two counterweights 78 for counterbalancing the motor 84 about the central longitudinal axis of the beam.

The carriage 44 is traversed along the beam by a lead screw 80 journaled at its ends in brackets 81 fixed to the beam and in screw threaded engagement with a nut 82 fixed to the carriage. The screw is located above the beam and preferably disposed in and along the plane which passes through the apexes of the two tracks 42. The lead screw 80 passes through the V-shaped opening in the upper roller 45 thus making a compact and efficient construction. The screw is rotated by a motor 84 carried by a bracket 85 at one side of the beam and having a shaft 86 connected to reduction gearing at 87 at the other side of the beam. A chain 88 and sprockets operatively connect the reduction gearing to the screw. Automatic reversing mechanism for the screw includes a switch 90 and reversing rod 92 mounted on the beam and adapted to be engaged and reciprocated in opposite directions by the carriage.

The machine is adapted to the general sawing and grinding of granite and the like, but is also applicable to the processing of slate, limestone, marble, sandstone, cast stone and other types of stone. Different materials require different wheel cutting velocities and carriage feeding speeds and these variations are provided by the employment of change gearing.

It will be apparent that my machine is universally applicable to cutting in any plane and at any angle lying between and including the vertical and horizontal. Furthermore, the compact and suspended carriage and frame of my machine eliminates the necessity for any carriage framing over the V-rails, except for the wheels 45, and permits adjusting the spindle 47 closely adjacent to the beam and the disposing of the cutter 48 closely adjacent to the carriage and beam. Disposing the tracks 42 in the central vertical plane of the beam balances the load and provides a superior and compact unit.

Having thus disclosed my invention what I claim as new and desire to secure by Letters Patent is:

1. A stone cutting machine comprising spaced vertical columns having vertically adjustable sleeves thereon, a horizontal beam mounted for rotary adjustment in the sleeves about a horizontal axis, two spaced and parallel guiding tracks rigid with and disposed in opposed relation along opposite sides of the beam, a carriage mounted to move on and along the tracks, a frame mounted on the carriage, a spindle journaled in the frame transversely of and beneath the beam, a stone cutting wheel on the spindle at one side of the beam, a motor carried by the frame at the other side of the beam, driving means connecting the motor to the spindle, and means for moving the frame on the carriage in a direction transversely of the spindle and beam.

2. The machine defined in claim 1 in which the two tracks are disposed respectively above and below the body of the beam.

3. The machine defined in claim 2 in which the tracks are V-shape in cross section and their apexes are in a common vertical plane.

4. The machine defined in claim 1 in which the two tracks are disposed respectively above and below the body of the beam in a single plane substantially coincident with and parallel to the central longitudinal axis of the beam.

5. The machine defined in claim 1 in which the frame is supported by a plurality of vertical and parallel rods fixed to the frame and mounted for longitudinal movement by said rods in guide bearings in the carriage.

6. The machine defined in claim 5 in which the frame is supported by two of said rods at one side of the beam and by one such rod at the opposite side of the beam, the spindle carrying portion of the frame being fixed to one end of the rods and another portion of the frame uniting the rods into a unit at their other ends.

7. The machine defined in claim 1 plus means supporting the beam at its ends for rotary adjustment about it longitudinal axis, and means for counterbalancing the motor about said axis.

8. The machine defined in claim 1 in which the frame is supported by a plurality of vertical and parallel rods fixed to the frame and mounted for longitudinal movement in guide bearings in the carriage and in which said carriage-moving means comprises a shaft parallel with the rods and connections to the carriage and frame including a screw threaded connection for effecting such movement of the frame upon rotation of the shaft.

9. The machine defined in claim 1 in which the carriage and frame each embodies an annular construction both entirely surrounding the beam.

10. A stone sawing machine comprising spaced upright supports, a horizontal beam mounted between said supports, a saw carriage assembly including rollers traveling on opposite sides of the beam, tracks on the beam for the rollers having faces converging toward a common plane, and connections between the supports and beam providing for rotation of the beam through 360° with the carriage assembly capable at all times of longitudinal movement thereon.

11. A stone sawing machine comprising spaced vertical columns, a horizontal beam mounted thereon for vertical and rotary adjustment, V-shaped tracks on the beam, a saw carriage having rollers with grooves about their peripheries which are V-shaped in cross section and run on said tracks, and a lead screw connected to the saw carriage, movable with the beam and passing through the V-shaped grooves in the said rollers at one side of the beam.

LANGDON I. GARRISON.

REFERENCES CITED

The following references are of record in the file of this patent:

UNITED STATES PATENTS

| Number | Name | Date |
| --- | --- | --- |
| 637,961 | Gillies | Nov. 28, 1899 |
| 1,097,034 | Lautz | May 19, 1914 |
| 1,650,422 | Brown | Nov. 22, 1927 |
| 2,195,108 | Graff | Mar. 26, 1940 |
| 2,450,523 | Parker | Oct. 5, 1948 |